United States Patent [19]

Lederman

[11] Patent Number: 4,834,227

[45] Date of Patent: May 30, 1989

[54] INTEGRALLY MOLDED ROLLER CLUTCH CAGE AND ENERGIZING SPRING

[75] Inventor: Frederick E. Lederman, Sandusky, Ohio

[73] Assignee: General Motors Corporation, Detroit, Mich.

[21] Appl. No.: 126,195

[22] Filed: Nov. 27, 1987

[51] Int. Cl.$^4$ ................................................ F16D 41/06
[52] U.S. Cl. ........................................ 192/45; 384/572
[58] Field of Search .............. 192/45, 44; 188/82.84; 384/572, 576, 578, 579

[56] References Cited

U.S. PATENT DOCUMENTS

| | | | |
|---|---|---|---|
| 3,184,020 | 5/1965 | Benson et al. | 192/45 |
| 3,260,333 | 7/1966 | Benson et al. | 192/45 |
| 3,339,687 | 9/1967 | Cowles | 192/45 |
| 3,404,760 | 10/1968 | Benson et al. | 192/45 |
| 3,537,554 | 11/1970 | Elmore et al. | 192/45 |
| 3,863,742 | 2/1975 | Elmore et al. | 192/45 |
| 3,937,312 | 2/1976 | Gehrke | 192/45 |
| 4,620,806 | 11/1986 | Rabe | 384/572 |

*Primary Examiner*—Rodney H. Bonck
*Assistant Examiner*—Richard M. Lorence
*Attorney, Agent, or Firm*—Patrick M. Griffin

[57] ABSTRACT

An integrally molded roller clutch cage and energizing spring in which the spring is generally X shaped, with one back end molded to the cage, another back end free to slide along a cage guide surface, and two front ends engaged with the roller. The spring can compress without limiting roller travel, and helps to limit roller skew.

2 Claims, 3 Drawing Sheets

INTEGRALLY MOLDED ROLLER CLUTCH CAGE AND ENERGIZING SPRING

BACKGROUND OF THE INVENTION

Overrunning clutches of the type that have a complement of spring engergized cylindrical rollers are found in many applications where it is desired to allow relative rotation in one direction only between a race with a cylindrical pathway, and a coaxial cam race with a series of sloped cam ramps that confront the pathway. The typical roller clutch has a cage that provides its basic structural framework and which also provides roller retention pockets that axially confine the rollers, as well as providing a mounting foundation for the roller energizing springs. The total unit of cage, rollers and springs is installed in one step between the races, typically by a method known as ringing in. Ringing in involves sliding the clutch onto the cam race and then pushing the pathway race axially into place with a simultaneous twisting motion. The twisting of the pathway race shifts the rollers down their respective cam ramps from a shipping position to an operative position, compressing the springs. After installation, each roller is then continually spring biased up its respective cam ramp into engagement between the pathway and cam ramp, where it is ready to lock up quickly. In many such applications, because of running eccentricity between the clutch races, it is necessary that the rollers move circumferentially over a significant distance, traveling continually up and down the cam ramp so as to always be in the optimal lock up ready position. This motion of the rollers is generally referred to as the roller travel, and it can cover a distance of more than a roller diameter, as well as being quite rapid at high race speeds.

The roller energizing spring should do nothing, in the ideal case, to limit roller travel, which would jeopardize efficient clutch operation. The spring should, therefore, be able to freely flex over a sufficient distance to follow the roller. It is also important that the spring not cause the roller to axially skew, and, ideally, the spring would actually help maintain the roller stable and parallel to the race axis during roller travel. While cages are commonly molded of plastic in one piece, often by the economical by pass molding technique, the most common roller energizing spring is still a separate metal piece. Such springs are generally fixed to the cage by some type of locking latch, and the separate and individual assembly of each spring to the cage is one of the most difficult, time consuming and expensive aspects of roller clutch manufacture.

It is known in the art to avoid separate spring assembly by integrally molding the cage and energizing springs. Such units, however, have generally found use only in very lightly loaded, low force applications, because they do not provide for significant, unimpeded roller travel. One such design is disclosed in U.S. Pat. No. 3,260,333 to Benson et al, which has generally V shaped springs integrally molded to the cage cross bars, although the cage is not of a configuration that can be by pass molded. As the roller travels, the V opens and closes. The degree of spring flexing is deliberately limited, however, so the possible roller travel is not very large. A more detailed analysis of this particular spring will be given below. Another integrally molded cage-spring unit is disclosed in U.S. Pat. No. 4,620,806, in which the spring is an integrally molded flap that initially sticks radially outwardly beyond the OD of the annular space between the races, but which is bent inwardly and down at installation. The flaps then each push out out against a roller to bias it. This design has the advantage of being by pass moldable, but there is, again, a very limited roller travel. As can be seen in FIG. 1, which shows the roller shipping position, if the roller were to shifted at all during clutch installation, there would be almost no flex room left at all for the spring, and, consequently, very little roller travel. In addition, the flap would likely be deformed radially outwardly into one of the races as it flexed if the roller did have a significant travel distance. Furthermore, a flap of the type shown would block the possibility of any significant radial lubricant flow across the annular space between the clutch races, making it unsuitable for use in many automatic transmission environments.

SUMMARY OF THE INVENTION

The invention provides an integrally molded clutch cage and energizing spring which does not have the potential drawbacks of the known integral cage-spring units described above. In addition, the spring flexes in such a way as to help prevent roller skew.

In the embodiment disclosed, the cage is made up of a series of generally rectangular, snap together roller retention pockets, each molded of plastic with parallel first and second side rails. The side rails axially confine each roller as it travels between the clutch races. A cross bar of each retention pocket is oriented perpendicular to the side rails and generally parallel to the clutch race axis. Within each retention pocket is a generally X shaped energizing spring. The spring includes four generally equal length beams that radiate symmetrically from a flexible spring center section, with two generally coplanar beam ends at the front, facing the roller, and two generally coplanar beams ends at the back, near the cross bar. One of the back beam ends fixed is to the roller pocket, integrally and flexibly molded near the junction of the cross bar surface and the first side rail. The other back beam end is free, slidably engageable with the cross bar surface, and spaced from the second retention pocket side rail by a predetermined distance. The two front beam ends are slidably engaged along the side of the roller, and are spaced apart by most of the roller's length, with one front beam end near the first side rail, and the other spaced from the second side rail by approximately the same predetermined distance. The front beam ends are spaced apart, therefore, sufficiently widely to provide a well balanced, stable energizing force to the roller.

During clutch overrun, as the roller moves back and forth between the retention pocket side rails, the beams of the spring flex symmetrically about the center section, providing a continual bias to the roller. Specifically, as the roller moves toward the guide surface and the spring compresses, the fixed back beam end flexes relative to the cage. The free back beam end concurrently slides along and is guided by cross bar surface, moving relatively away from the fixed beam end and axially toward the second side rail. The two front beam ends also concurrently slide apart, with one front beam end also sliding toward the second side rail. The predetermined distance referred to is sufficient that no part of the spring will interfere with the side rails. Therefore, roller travel is not limited by the spring. In addition, as the free back beam end slides along the guide surface, the two front beam ends are thereby maintained generally parallel to the race axis, helping to prevent roller skew.

It is, therefore, an object of the invention to provide a roller clutch cage with integrally molded energizing springs in which the energizing springs provide a well balanced and stable energizing force to the rollers, but do not interfere with or limit the roller travel.

It is another object of the invention to provide such an energizing spring which also helps to prevent the roller from skewing.

It is another object of the invention to provide such an integrally molded energizing spring that is generally symmetrical and X shaped with four beams radiating from a flexible center, including one back beam end flexibly molded to part of the cage, another back beam end freely slidable along a cage guide surface, and two widely spaced front beam ends slidably engaged with roller, so that the spring can flex freely without limiting roller travel, and will also help to maintain the roller parallel to the race axis.

DESCRIPTION OF THE PREFERRED EMBODIMENT

These and other objects and features of the invention will appear from the following written description, and from the drawings, in which.

Figure 1:
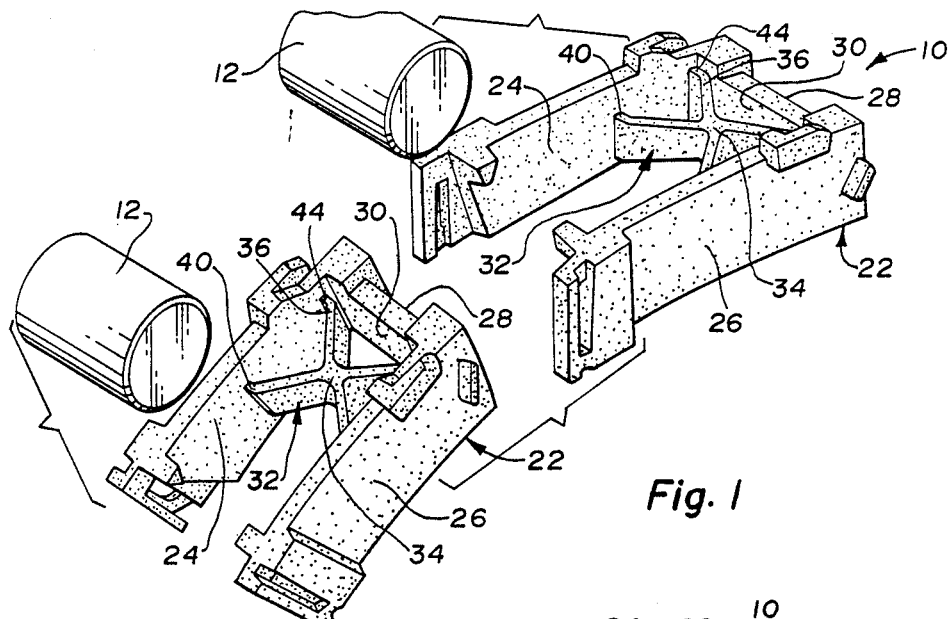
FIG. 1 is an exploded perspective view of a portion of the preferred embodiment before assembly showing two cage sections before they are snapped together, two springs, and two rollers.
Figure 3:
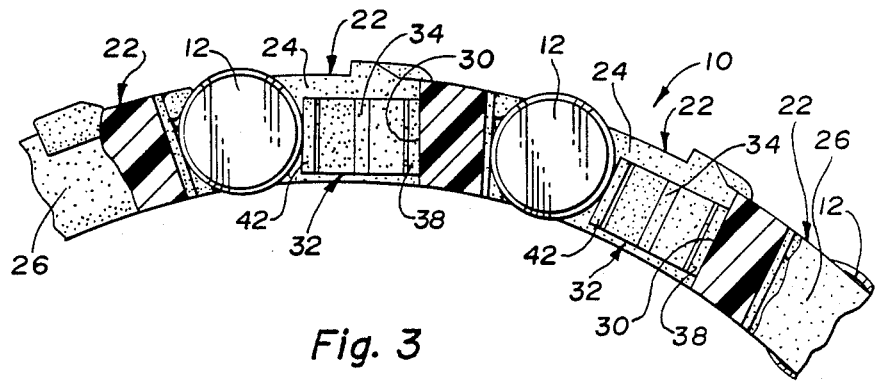
FIG. 3 is an end view of a portion of the assembled clutch before installation of the clutch and showing part of the pocket side rails broken away.
Figure 4:
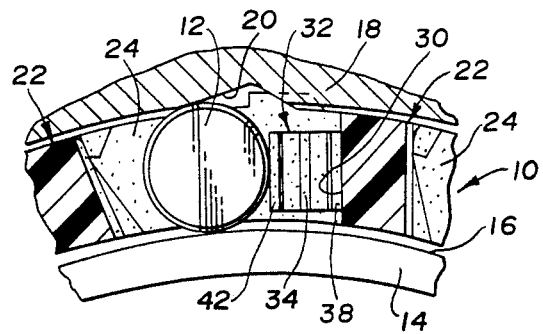
FIG. 4 is a view of a smaller portion of the clutch after installation of the clutch between the races.
Figure 5:
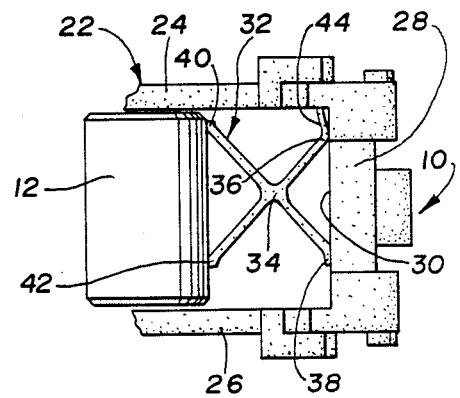
FIGS. 5-8 show the compression of one of the springs of the invention.
Figure 6:
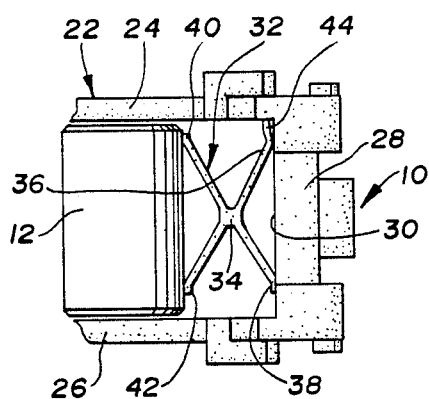
Figure 9:
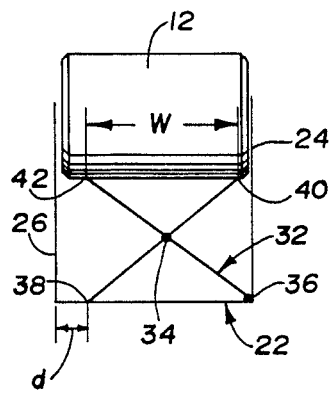
Figure 11:
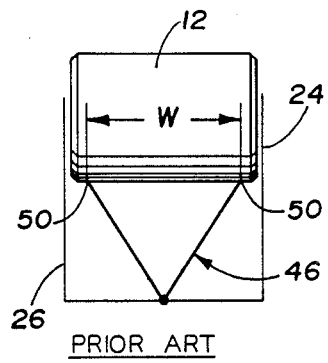
Figure 13:
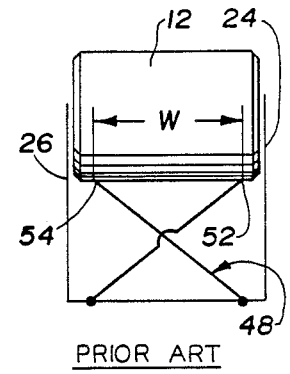
Figure 10:
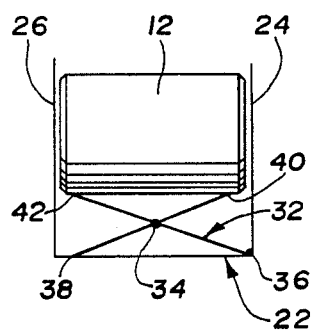
Figure 12:
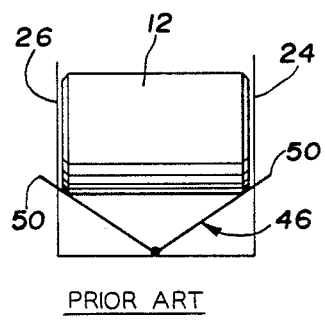
Figure 14:
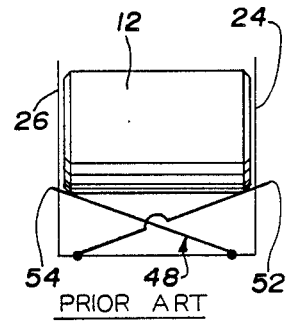

FIGS. 9-10 schematically show the compression of one of the springs of the invention;

FIGS. 11-12 schematically show the compression of one prior art spring for comparison;

FIGS. 13-14 schematically show the compression of another prior art spring for comparison. Referring first to FIGS. 1, 3 and 4, a preferred embodiment of a roller clutch incorporating the integrally molded energizing spring of the invention is designated generally at 10. Clutch 10 uses a complement of spring energized cylindrical rollers 12 to allow selective relative rotation between an inner 14 race that includes a cylindrical pathway 16 and an outer cam race 18, which has a series of sloped cam ramps 20 that confront the pathway 16. Clutch 10 has a cage that is made up of a series of generally rectangular, snap together roller pocket sections, indicated generally at 22. Pockets 22 are molded of plastic with parallel first and second side rails 24 and 26. Side rails 24 and 26 are joined by a cross bar 28, the inner surface 30 of which is perpendicular to the inside of the side rails 24 and 26, and therefore generally parallel to the axis of races 14 and 18. Surface 30 serves as a guide surface, as will be further described below. The side rails 24 and 26 confine each roller 12, establishing the axial boundaries beyond which it cannot go as it travels circumferentially up and down its respective cam ramp 20 during clutch overrun. The snap together sections 22 are merely illustrative of one possible cage. A great advantage of sections 22 is that they may be by pass molded, that is, molded by a single pair of mold elements that part along a straight line. Another cage might be made up of molded plastic journal blocks sandwiched between metal end rings, in which case it would be the metal end rings that established the axial roller boundaries. Either cage would provide a basic structural framework to allow the clutch to be handled as a unit and installed between the clutch races with the conventional pushing and twisting, or ringing in, method. Either cage, even if not entirely formed of plastic, would still have some component or section that was molded of a plastic material, and therefore capable of having a suitably resilient and flexible energizing spring molded integrally to it, as is next described.

Figure 2:
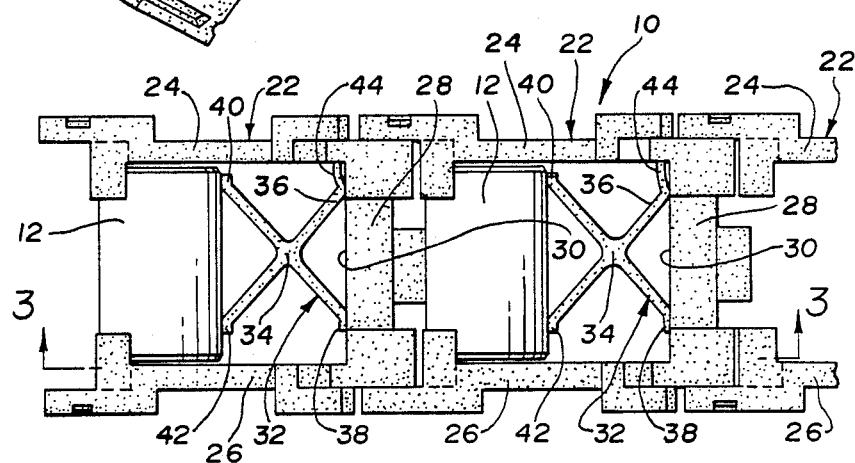
FIG. 2 is a plan view of the same portion of the assembled clutch showing the rollers in place.

Referring next to FIGS. 1, 2, and 3, a generally X shaped energizing spring 32 is located within each pocket 22. Four equal length legs or beams radiate symmetrically outwardly from a flexible center section 34 at approximately 45 degrees to first and second coplanar beam ends 36 and 38 at the back, near cross bar surface 30, and to third and fourth coplanar beam ends 40 and 42 at the front, facing roller 12. Spring 32 is fixed to roller pocket 22 at a point near the junction of the cross bar surface surface 30 and the first side rail 24. Specifically, each first beam end 36 is molded integrally to a respective roller pocket 22 at a live hinge 44 that is flexible and durable. The second beam end 38 is not fixed, and has a flat surface or foot that is slidably engageable with the cross bar surface 30. The second beam end 38 is also axially spaced from the inside of the second side rail 26 by a predetermined distance, for a reason described below. After the roller pockets 22 are snap fitted together, the rollers 12 are pushed down between the side rails 24 and 26, and the third and fourth beam ends 40 and 42 then resiliently contact the side of the each roller 12, holding it against the opposite side of the adjacent cross bar 28 at a shipping retention position, as seen in FIGS. 2 and 3. The shipping position represents one of roller 12's limit positions, that is, its farthest possible position from the cross bar surface 30. In the shipping position, the front beam ends 40 and 42 are fairly widely spaced apart, with the third beam end 40 located near the first side rail 24, and the fourth beam end 42 located near the second side rail 26. Fourth beam end 42 is not as near the second side rail 26, however, but is spaced therefrom by at least the same predetermined distance that the second beam end 38 is axially spaced from the second side rail 26, for a reason explained below. Therefore, the front beam ends 40 and 42 do not engage roller 12 exactly symmetrically about the roller center, but are widely enough spaced and cover enough of the total length of roller 12 to provide a stable, well balanced energizing force thereto.

Figure 7:
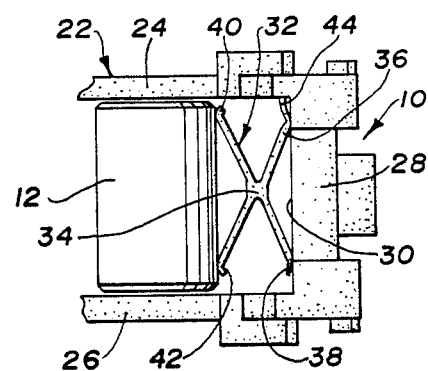
Figure 8:
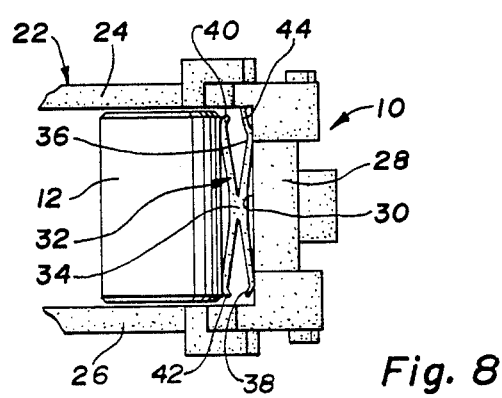

Referring next to FIG. 4, and to FIGS. 5 through 8, clutch 10 is installed between the races 14 and 18 by the well known ringing in method. Such installation further compresses the springs 22 as the rollers are shifted to the right from their shipping down the cam ramps 20 to the nominal operative position of FIG. 4. Then, when clutch 10 overruns and the rollers 12 travel circumferentially up and down the cam ramps 20, spring 32 will be subject to rapid compression and expansion as it follows its roller 12 and biases it continually up cam ramp 20 to maintain its optimal ready position. The detailed motion of spring 32 as it compresses while following its roller 12 may be seen by following FIGS. 5 through 8 in order. The expansion of spring 32, of course, follows the reverse pattern. As seen in comparing FIGS. 5 to 6, spring 32 has just begun to compress as roller 12 moves toward the cross bar surface 30. In general, spring 32 flattens down, and simultaneously shifts or translates toward the second side rail 26. Specifically, the four beams of the X flex symmetrically about the center section 34 as the first beam end 36 flexes down about hinge 44 and the second beam end 38 concurrently slides along the cross bar surface 30, moving relatively away from the fixed first beam end 36 and axially toward the second side rail 26. The two front beam ends 40 and 42 also concurrently slide relatively apart. While the third beam end 40 remains substantially at the same position against roller 12, the fourth beam end shifts along the surface of roller 12, moving axially toward the second side rail 26. As seen in FIG. 7, spring 22 has flattened more, and the second and fourth beams ends 38 and 42 have moved closer yet to the second side rail 26. Finally, as seen in FIG. 8, if roller 12 moves as far as it can toward cross bar 28, which is a second limit position generally referred to as roller pop out, spring 22 will be essentially flattened out. The front beam ends 40 and 42 are now approximately centered relative to roller 12, but neither the second 38 nor third beam end 42 has hit the second side rail 26. Therefore, roller 12 can travel as far as it is physically possible for it to do, with no interference by spring 32. Normally, of course, roller 12 would not move back as far as in FIG. 8, but it can do so. Another advantage of spring 32 is that as the second beam end 38 slides across the cross bar surface 30, it will move parallel to the axis of the races 14 and 18. Consequently, the third and fourth beams ends 40 and 42 will also be maintained in a plane essentially parallel to the surface 30. This guidance provided by the cross bar surface 30 helps to prevent the roller 12 from skewing as it travels. Moreover, spring 32 presents very little radial surface area that could block the flow of lubricant across the annular space between the races 14 and 18, a great advantage for automatic transmission applications.

The advantage of the way in which spring 32 flexes may now be better understood by referring to FIGS. 9 through 14, which schematically show and compare the flexing of spring 32 and of two prior art springs. FIGS. 9 and 10 represent the flexing of spring 32, which is disclosed as an absolutely symmetrical X, with four 45 degree beams or legs. Lines represent the axial roller travel boundaries provided by the side rails 24 and 26. The front two, or third and fourth, beam ends 40 and 42 start out in FIG. 9 with a separation of W, which represents most of the length of roller 12, and is thus a sufficiently wide separation to provide a well balanced, stable bias to roller 12. The second and fourth beam ends 38 and 42 also start out with the predetermined axial spacing from the second side rail 26 described above, denoted as d. As roller 12 moves and spring 32 compresses to the FIG. 10 position, no part of the spring 32 interferes with the side rails 24 or 26, so the roller 12 can travel freely. FIG. 11 and 12 illustrate the equivalent compression with the same roller travel and within the same available space for a spring 46 that is like the V shaped molded spring from U.S. Pat. No. 3,260,333 described above. As seen in FIG. 11, the two roller contacting beams ends 50 of the spring 46 start out with the same separation W, centered on roller 12. But, as seen in FIG. 12, if roller 12 were to move the same distance as in FIG. 10, the beam ends 50 would have to move beyond the side rails 24 and 26 which, of course, they cannot do. Therefore, roller travel would be severely limited, and the only solution would be to start out with an initial separation W that was much less. The same problem exists for spring 48, which has two separate beams 52 and 54 that cross each other. Spring 48 is actually stamped of metal, since it would be almost impossible to mold. If the beams 52 and 54 were to start out contacting roller 12 with the same separation W, they, too, would hit the side rails 24 and 26, preventing the degree of roller travel that spring 32 of the invention allows. Although the calculations are not repeated here, it can be shown that with the absolutely symmetrical spring 32 shown in FIGS. 9 and 10, if it were to be flattened out completely, the front beam ends 40 and 42 would separate 41% farther than their initial separation W. This, then, determines how much clearance d should exist to accommodate the greatest possible spring compression. For spring 46, however, the equivalent increase in the separation of the front beam ends 50 would be 124%. The situation is not quite as bad for the front beam ends of spring 48, an approximate 80% increase. In conclusion, for either spring 46 or 48 to be able to flex freely within the equivalent axial boundaries of side rails 24 and 26 without limiting roller travel, they would have to start out with a much smaller initial separation. This would represent a less stable and less well balanced bias force on the roller 12. Thus, the advantages of spring 32 can be clearly seen.

Variations of the preferred embodiment 10 could be made. As noted, any moldable cage section could provide an opportunity to integrally mold the spring 32 of the invention thereto. Spring 32 could, if desired, have its compression distance doubled by building an X on an X, in effect, with each half working essentially the same as the spring 32 disclosed. Therefore, it will be understood that the invention is not intended to be limited to just the embodiment disclosed.

The embodiments of the invention in which an exclusive property or privilege is claimed are defined as follows:

1. A cage and integrally molded energizing spring for an overrunning clutch of the type having a pair of substantially coaxially disposed races and a plurality of cage retained cylindrical rollers that move circumferentially between said races as said clutch operates, comprising, a cage having a series of molded roller retention pockets, one for each roller, within which said rollers move as said clutch operates, a series of generally X shaped molded energizing springs within said roller pockets, each spring including four beams joined at a central section with two generally coplanar front beam ends that are resiliently engageable with said roller and two generally coplanar back beam ends, one of which is integrally molded flexibly to said roller pocket and the other of which is free to move axially within said roller pocket, whereby, as said roller moves circumferentially, said beams can flex substantially symmetrically about said center section as said one back beam end flexes relative to said roller pocket and said other back beam end moves freely within said roller pocket, thereby energizing said roller without limiting its circumferential motion within said roller pocket.

2. A cage and integrally molded energizing spring for an overrunning clutch of the type having a plurality of cage retained cylindrical rollers that are confined within first and second spaced axial boundaries, are oriented generally parallel to the axis of a pair of substantially coaxial clutch races and which move circumferentially between first and second limit positions within said axial boundaries as said clutch operates, comprising, a molded cage section having a generally planar guide surface thereon that faces one of said rollers and which is oriented substantially parallel to said race axis, a generally X shaped energizing spring resiliently engageable with said roller, including four substantially symmetrical beams joined at a central section, with a first beam end integrally and flexibly molded to said cage section, a second beam end having a bearing surface thereon slidably engageable with said guide surface and axially spaced from said second axial boundary by a predetermined distance when said roller is at its first limit position, a third beam end slidably engageable with said roller and located near said first axial boundary when said roller is at its first limit position, and a fourth beam end slidably engageable with said roller and axially spaced from said third beam end by substantially the length of said roller and also axially spaced from said second axial boundary by substantially said predetermined distance when said roller is at its first limit position, whereby, when said roller is at its first limit position, said third and fourth beam ends engage said roller at widely separated points, and as said roller moves circumferentially toward said guide surface from its first to its second limit position, said beams will flex substantially symmetrically about said center section as said third and fourth beam ends slide apart along said roller and said fourth beam end moves toward said second axial boundary while said first beam end flexes relative to said cage section and said second beam end bearing surface concurrently slides along said guide surface toward said second axial boundary, thereby maintaining said third and fourth beam ends substantially parallel to said race axis, said predetermined distance being sufficient to prevent said fourth and second beam ends from moving beyond said second axial boundary, said spring thereby providing a well balanced energizing force to said roller while maintaining said roller substantially parallel to said race axis without limiting the circumferential movement of said roller.

* * * * *